(12) United States Patent
Chen

(10) Patent No.: US 6,517,276 B2
(45) Date of Patent: Feb. 11, 2003

(54) CONNECTOR FOR ORTHOGONAL PLATES

(75) Inventor: Yun Lung Chen, Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 30 days.

(21) Appl. No.: 09/894,093

(22) Filed: Jun. 28, 2001

(65) Prior Publication Data
US 2003/0002915 A1 Jan. 2, 2003

(51) Int. Cl.[7] .................................................. F16B 5/00
(52) U.S. Cl. ................................... 403/231; 248/224.8
(58) Field of Search ....................... 108/147.16, 147.17, 108/193; 248/224.8; 52/283; 403/403, 382, 326, 329, 230, 231, 240, 242, 249

(56) References Cited

U.S. PATENT DOCUMENTS

| | | | | |
|---|---|---|---|---|
| 4,448,321 A | * | 5/1984 | Hanlet | 156/69 |
| 4,479,737 A | * | 10/1984 | Bergh et al. | 220/690 |
| 5,508,902 A | * | 4/1996 | Shoemaker | 362/260 |
| 6,135,666 A | * | 10/2000 | Kelly et al. | 403/13 |

FOREIGN PATENT DOCUMENTS

DE 3741533 A1 * 6/1989 ............. F16B/5/07

* cited by examiner

Primary Examiner—James R. Brittain
(74) Attorney, Agent, or Firm—Wei Te Chung

(57) ABSTRACT

A connector includes a first plate (10) and a second plate (30) perpendicular to the first plate. The first plate includes a base (12) defining two cutouts (16), and a perpendicular flange (14) defining a locking slot (19) and defining two openings (18) in communication with the corresponding cutouts. Two shoulders (17) are formed in the first plate on opposite sides of each cutout. The second plate includes two protrusions (32) and two hooks (44). Each protrusion defines two horizontal grooves (36), and two vertical grooves (37) for facilitating deformation of the protrusion. Two pairs of slits (38) are defined in a rearmost periphery of each protrusion, in communication with the corresponding grooves. In joining the first and second plates together, the horizontal grooves receive the corresponding shoulders. Edges of the flange adjacent each opening engage in the corresponding slits, and the hooks engage in the locking slot.

17 Claims, 5 Drawing Sheets

CONNECTOR FOR ORTHOGONAL PLATES

BACKGROUND OF THE INVENTION

1. Field of the Invention

The present invention relates to connection for two plates, and particularly to simple connection for two orthogonal plates.

2. Prior Art

In modem manufacturing, more and more orthogonal plates are being required to be joined together. Oftentimes, two orthogonal plates are joined by means of screws, rivets, staking, spot welding and so on. Two orthogonal plates are also often joined by means of other kinds of connectors.

FIG. 5 shows a conventional connector for a pair of orthogonal first and second plates 1, 2. The connector comprises a male connector 12 and a female connector 22. The male connector 12 comprises a hollow first protrusion 14 defining a screw hole 15. The male connector 12 is secured on the first plate 1 by means of screws (not labeled). The female connector 22 comprises a hollow second protrusion 24 for receiving the first protrusion 14. A spring tab 26 extends from one edge of the second protrusion 24. The tab 26 defines a through hole 27 corresponding to the screw hole 15. The female connector 22 is secured on the second plate 2 by means of screws (not labeled). In assembly of the first and second plates 1, 2, the first protrusion 14 of the male connector 12 is received in the second protrusion 24 of the female connector 22. A bolt 3 is then extended through the through hole 27 of the female connector 22 to engage in the screw hole 15 of the male connector 12.

The male and female connectors 12, 22 must first be secured on the first and second plates 1, 2 by means of screws. This requires a tool, and is unduly complicated and time-consuming.

SUMMARY OF THE INVENTION

Accordingly, an object of the present invention is to provide a connector which can readily and securely join two orthogonal plates together.

Another object of the present invention is to provide a connector for joining two orthogonal plates which does not require use of any tools.

To achieve the above-mentioned objects, a connector in accordance with the present invention comprises a first plate and a second plate perpendicular to the first plate. The first plate comprises a base and a flange extending perpendicularly upwardly from one edge of the base. The base defines a pair of rectangular cutouts at such edge. The flange defines a pair of rectangular openings in communication with the corresponding cutouts, and a locking slot between the openings. A pair of shoulders is formed in the first plate on opposite sides of each cutout. The second plate forms a pair of protrusions, and a pair of hooks between the protrusions. Each protrusion defines a pair of horizontal grooves, and a pair of vertical grooves for facilitating deformation of the protrusion. Two pairs of slits are defined in a rearmost periphery of each protrusion, in communication with the corresponding grooves. In joining the first and second plates together, the horizontal grooves receive the corresponding shoulders. The slits engagingly receive corresponding edges of the flange adjacent the corresponding openings, and the hooks engage with the flange in the locking slot.

Other objects, advantages and novel features of the present invention will be drawn from the following detailed embodiment of the present invention with attached drawings, in which:

DESCRIPTION OF THE PREFERRED EMBODIMENT

Figure 1:
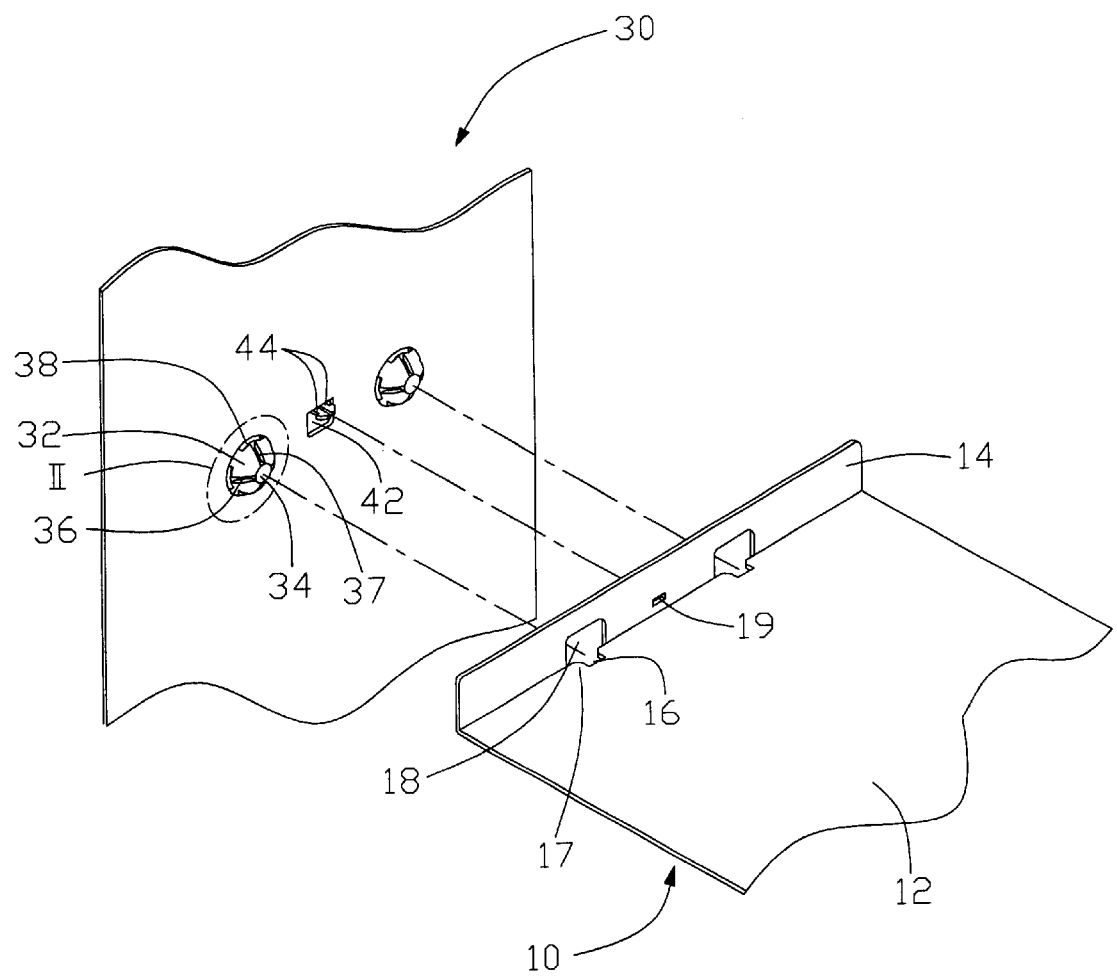
FIG. 1 is an exploded view of a connector in accordance with a preferred embodiment of the present invention.

Referring to the attached drawings, FIG. 1 is an exploded view of a connector in accordance with a preferred embodiment of the present invention. The connector comprises a first plate 10, and a second plate 30 perpendicularly attachable to the first plate 10.

The first plate 10 comprises a base 12, and a flange 14 extending upwardly from one edge of the base 12. A pair of rectangular cutouts 16 is defined in the base 12, extending from the edge from which the flange 14 extends. A pair of rectangular openings 18 is defined in the flange 14, in communication with the corresponding cutouts 16 of the base 12. Each cutout 16 is shorter than the corresponding opening 18, and communicates with a central portion of the corresponding opening 18. A pair of shoulders 17 is thereby formed in the base 12 on opposite sides of each cutout 16 respectively. A locking slot 19 is defined in the flange 14 between the openings 18.

Figure 2:
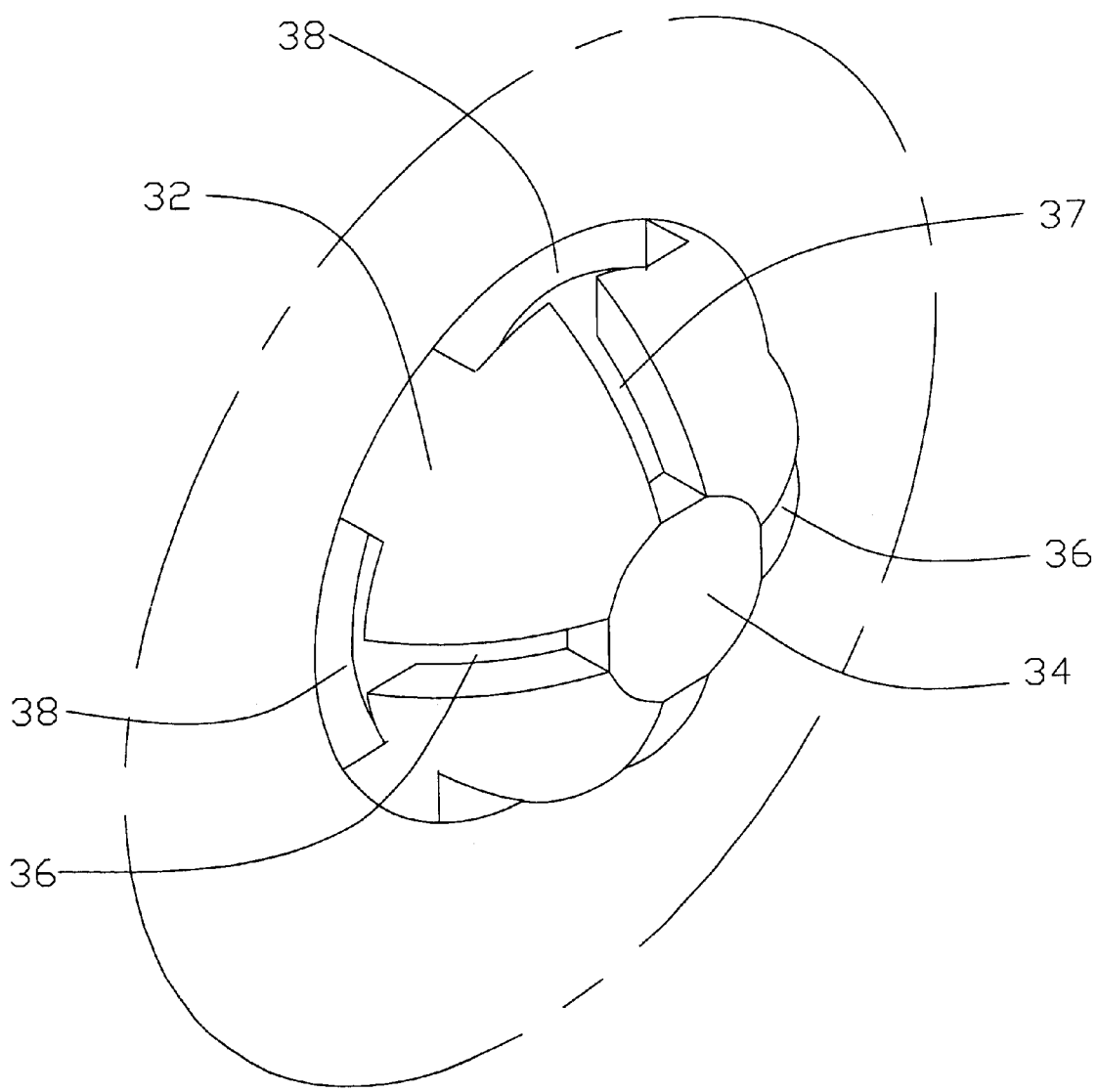
FIG. 2 is an enlarged view of a protrusion of the connector of FIG. 1, as indicated by the line II of FIG. 1.

Referring also to FIG. 2, the second plate 30 forms a pair of generally dome-shaped protrusions 32 by stamping. The protrusions 32 correspond to and face to the openings 18 of the first plate 10. Each protrusion 32 comprises an end section 34. Each protrusion 32 is divided into four equal portions by a pair of horizontal grooves 36 and a pair of vertical grooves 37. Each horizontal and vertical groove 36, 37 extends from a rearmost portion of the protrusion 32 to the end section 34. The horizontal grooves 36 correspond to the shoulders 17 of the base 12. The vertical grooves 37 facilitate elastic deformation of the protrusions 32. Two pairs of slits 38 are respectively defined in the protrusion 32 at a rearmost periphery thereof. A central portion of each slit 38 is generally perpendicular to and in communication with the corresponding horizontal or vertical groove 36, 37. A rectangular aperture 42 is defined in the second plate 30, between the protrusions 32. A pair of hooks 44 extends from an edge of the second plate 30 adjacent a top extremity of the aperture 42. The hooks 44 extend in the same direction as the protrusions 32, and the hooks 44 symmetrically oppose each other.

Figure 3:
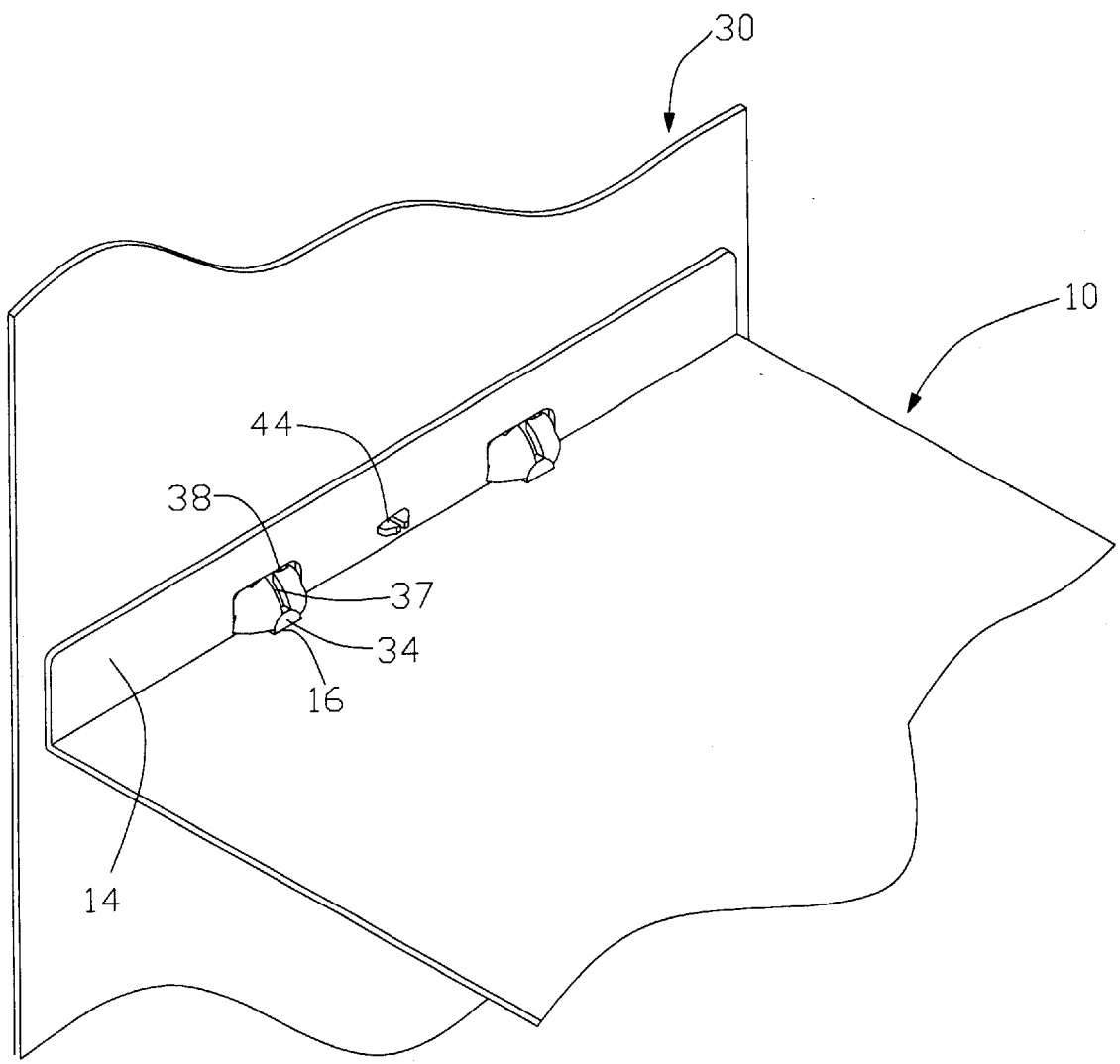
FIG. 3 is an assembled view of FIG. 1.

Referring also to FIG. 3, in assembly, the shoulders 17 of the first plate 10 are received in the corresponding horizontal grooves 36 of the second plate 30. The first plate 10 is then pushed toward the second plate 30. Three edges of the flange 14 of the first plate 10 adjacent each opening 18 are forced against corresponding rearmost portions of the corresponding protrusions 32. The rearmost portions of the protrusions 32 elastically deform until the three edges of the flange 14 adjacent each opening 18 are snappingly received in the corresponding slits 38 of the protrusions 32, whereupon the rearmost portions of the protrusions 32 elastically return to their original shapes. In this position, the end sections 34 of the protrusions 32 abut the first plate 10 in the cutouts 16. Simultaneously, the hooks 44 of the second plate 30 are deformably extended through the locking slot 19 of the first plate 10, until the hooks 44 snappingly engage with the flange 14. The first plate 10 and the second plate 30 are thus firmly and securely joined together.

Figure 4:
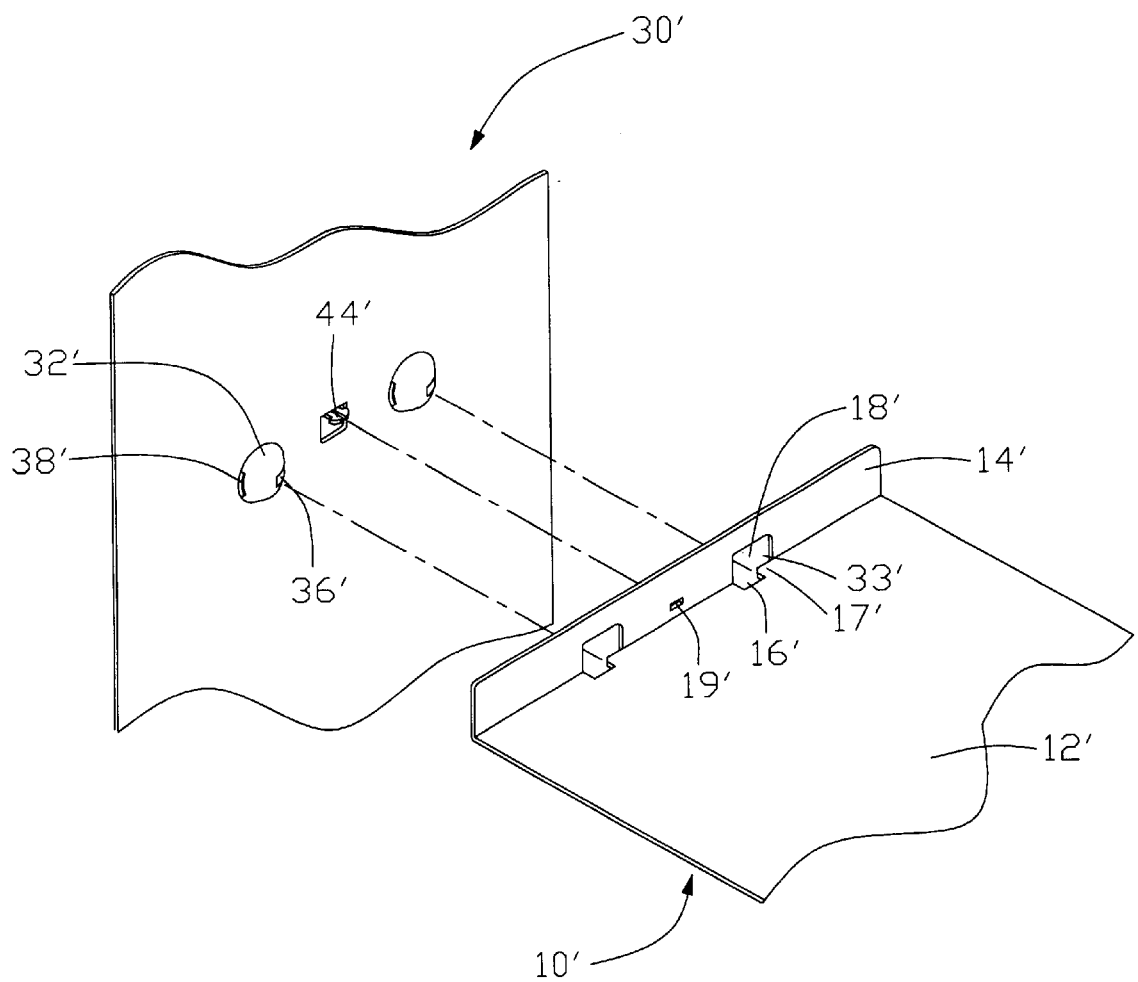
FIG. 4 is an exploded view of a connector in accordance with an alternative embodiment of the present invention.
Figure 5:
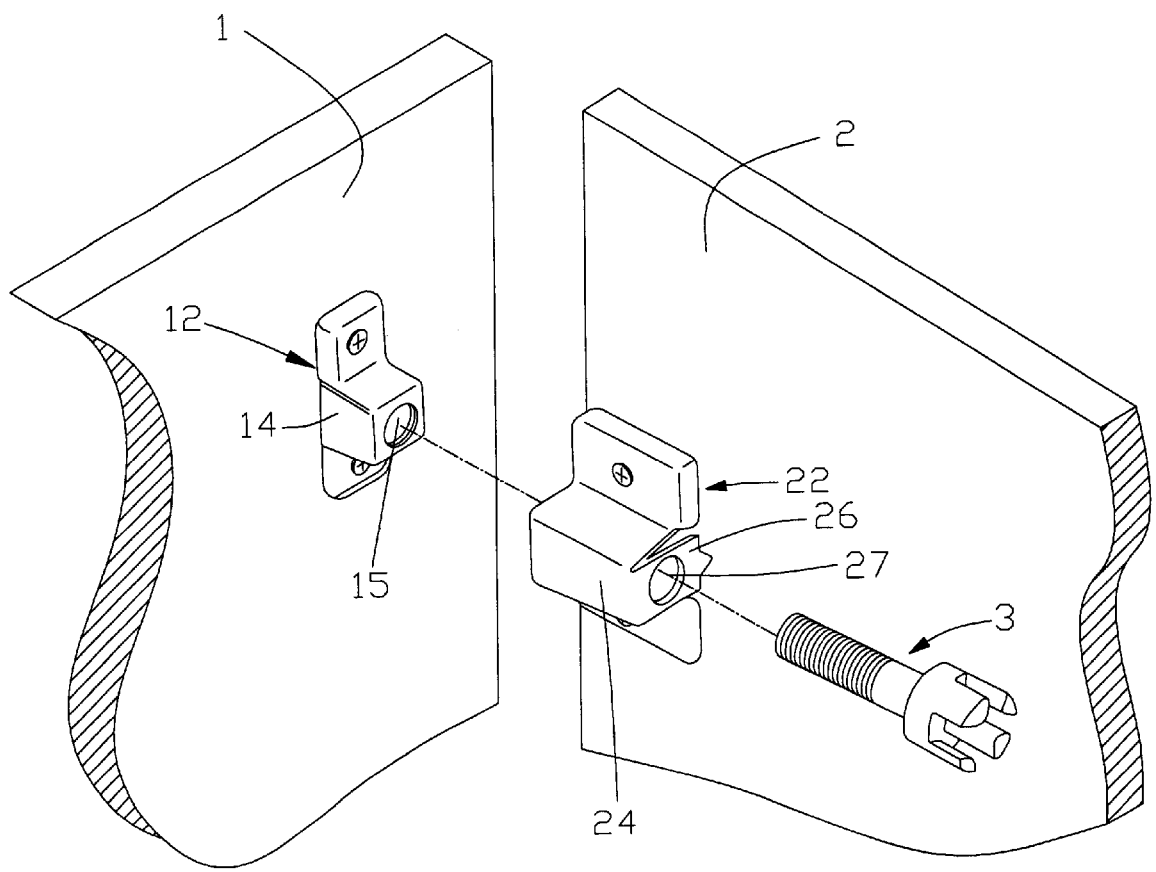
FIG. 5 is a pre-assembled perspective view of a conventional connector for joining two orthogonal plates.

FIG. 4 shows a connector in accordance with an alternative embodiment of the present invention. The connector comprises a first plate 10', and a second plate 30' perpendicular to the first plate 10'. The first plate 10' is similar to the first plate 10 of the preferred embodiment, and comprises a base 12' and a flange 14' extending perpendicularly upwardly from one edge of the base 12'. A pair of rectangular cutouts 16' is defined in the base 12', extending from the edge from which the flange 14' extends. A pair of rectangular openings 18' is defined in the flange 14', in communication with corresponding cutouts 16'. Each cutout 16' is shorter than the corresponding opening 18', and entirely communicates with an end portion of the corresponding opening 18'. A shoulder 17' is thereby formed in the first plate 10' on one side of each cutout 16'. A locking slot 19' is defined in the flange 14' between the openings 18'.

The second plate 30' comprises a pair of protrusions 32', corresponding to the openings 18' of the first plate 10'. Each protrusion 32' defines a horizontal groove 36', corresponding to the shoulder 17' of the first plate 10'. A slit 38' is defined in each protrusion 32' at a rearmost periphery thereof, opposite to and perpendicular to the horizontal groove 36'. A pair of hooks 44' extends from the second plate 30' between the protrusions 32'. The hooks 44' extend in the same direction as the protrusions 32', symmetrically oppose each other, and correspond to the locking slot 19' of the first plate 10'. Assembly of the first and second plates 10', 30' is similar to assembly of the first and second plates 10, 30 of the preferred embodiment.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A connector for connecting two plates together, comprising:
   a first plate comprising a base and a flange, the base defining at least one cutout, the flange defining at least one opening in communication with the at least one cutout, at least one shoulder being formed in the first plate on at least one of opposite sides of the at least one cutout; and
   a second plate forming at least one protrusion being extendable through the at least one opening and received in the at least one cutout, the at least one protrusion defining at least one slit and defining at least one groove receiving the at least one shoulder,
   wherein the first plate and the second plate are joined together by the flange engaging with the at least one protrusion in the at least one slit.

2. The connector as claimed in claim 1, wherein the flange further defines a locking slot, and the second plate further forms a pair of hooks engaging with the flange in the locking slot.

3. The connector as claimed in claim 2, wherein the flange defines a pair of openings and the second plate forms a pair of protrusions, the locking slot being located between the openings and the hooks being located between the protrusions.

4. The connector as claimed in claim 1, wherein the at least one cutout is shorter than the at least one opening, and entirely communicates with an end portion of the at least one opening.

5. The connector as claimed in claim 4, wherein the at least one slit is opposite to and perpendicular to the at least one groove.

6. The connector as claimed in claim 1, wherein the at least one cutout is shorter than the at least one opening and communicates with a central portion of the corresponding opening, and a pair of shoulders is thereby formed on opposite sides of the at least one cutout.

7. The connector as claimed in claim 6, wherein the at least one protrusion defines a pair of horizontal grooves respectively receiving the pair of shoulders.

8. The connector as claimed in claim 7, wherein a pair of slits is defined in the at least one protrusion in communication with corresponding horizontal grooves, the slits receiving two edges of the flange adjacent the at least one opening, whereby the flange is engaged with the second plate.

9. The connector as claimed in claim 8, wherein the at least one protrusion further defines a pair of vertical grooves for facilitating deformation of the protrusion, and still further defines a pair of slits in communication with the vertical grooves.

10. The connector as claimed in claim 1, wherein the at least one protrusion has an end section abutting the first plate in the at least one cutout.

11. A device for connecting a first and a second plate together, the device comprising:
    a protrusion formed on the second plate, at least one groove and at least one slit which are substantially perpendicular to each other being defined in the protrusion; and
    a cutout defined in the first plate thereby forming at least one shoulder on the first plate, a flange vertically extending from an edge of the first plate, an opening being defined in the flange and communicating with the cutout;
    wherein when the first and second plates are connected together, an edge of the flange beside the opening engages in the slit and the shoulder engages in the groove.

12. The device as claimed in claim 11, further comprises a locking slot defined in the flange and at least one hook formed on the second plate, the at least one hook fittingly engaging in the slot when the first and second plates are connected together.

13. The device as claimed in claim 12, wherein the groove is in communication with the slit.

14. The device as claimed in claim 12, wherein the groove and the slit are separated from each other.

15. The device as claimed in claim 13, wherein the protrusion has an end section received in the cutout.

16. The device as claimed in claim 15, wherein the end section abuts the first plate.

17. The device as claimed in claim 16, wherein the groove is located behind the end section and the at least one slit is located behind the groove.

* * * * *